United States Patent
Katta

(10) Patent No.: US 11,445,003 B1
(45) Date of Patent: Sep. 13, 2022

(54) SYSTEMS AND METHODS FOR AUTONOMOUS PROGRAM DETECTION

(71) Applicant: Citrix Systems, Inc., Fort Lauderdale, FL (US)

(72) Inventor: Rama Rao Katta, Fremont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/354,983

(22) Filed: Jun. 22, 2021

(51) Int. Cl.
*H04L 9/40* (2022.01)
*H04L 67/01* (2022.01)
*H04L 43/106* (2022.01)
*H04L 67/143* (2022.01)
*H04L 67/141* (2022.01)

(52) U.S. Cl.
CPC ............ *H04L 67/01* (2022.05); *H04L 43/106* (2013.01); *H04L 67/141* (2013.01); *H04L 67/143* (2013.01)

(58) Field of Classification Search
CPC ..... H04L 67/42; H04L 43/106; H04L 67/141; H04L 67/143
See application file for complete search history.

(56) References Cited

U.S. PATENT DOCUMENTS

| | | | |
|---|---|---|---|
| 7,461,120 B1* | 12/2008 | Artz, Jr. | H04L 67/22 709/203 |
| 8,838,570 B1* | 9/2014 | English | H04L 63/1408 707/709 |
| 9,654,575 B1* | 5/2017 | Sullivan | H04L 67/22 |
| 10,097,583 B1* | 10/2018 | Demirjian | H04L 63/08 |
| 10,326,789 B1* | 6/2019 | Vines | H04L 63/1466 |
| 2008/0301808 A1* | 12/2008 | Calo | H04L 63/168 726/23 |
| 2015/0156084 A1* | 6/2015 | Kaminsky | H04L 67/22 709/224 |
| 2016/0119371 A1* | 4/2016 | Rapaport | H04L 63/126 726/23 |
| 2016/0306974 A1* | 10/2016 | Turgeman | G06F 21/121 |
| 2018/0077179 A1* | 3/2018 | Zhang | H04L 63/1425 |
| 2018/0077181 A1* | 3/2018 | Chen | H04L 63/1425 |
| 2018/0103047 A1* | 4/2018 | Turgeman | H04L 63/08 |
| 2019/0222607 A1* | 7/2019 | Thatha | G06F 15/16 |
| 2020/0112578 A1* | 4/2020 | Gupta | H04L 63/1425 |
| 2021/0194969 A1* | 6/2021 | Syed | G06F 11/301 |

\* cited by examiner

*Primary Examiner* — Oanh Duong
(74) *Attorney, Agent, or Firm* — Foley & Lardner LLP

(57) ABSTRACT

Systems and methods for autonomous program management include a device which receives a request from a client responsive to execution of a script on the client. The request may include a location corresponding to the script and an identifier. The device may determine that activity of the client is activity of an autonomous program based on a comparison of the location to a reference being generated by the device for the client and determined using the identifier from the request. The device may block a subsequent request from the client to a server responsive to the determination.

20 Claims, 5 Drawing Sheets

SYSTEMS AND METHODS FOR AUTONOMOUS PROGRAM DETECTION

BACKGROUND

In a network environment, a plurality of client devices can be connected to one or more servers to access applications provided by the servers. As traffic to a server increases, the quality of service the server provides decreases as servers are overloaded or have insufficient resources to handle the traffic. The overload condition can result in service disruptions or failures.

SUMMARY

The present disclosure is directed towards systems and methods for bot (or autonomous program) detection. In some aspects, the present disclosure is directed towards a device (and corresponding method) for autonomous program detection in distributed systems in real-time.

Bots or autonomous programs (e.g., web robots) are prevalent in today's network traffic. For example, up to 40% of current internet/network traffic originates from autonomous programs. These autonomous programs typically fetch content from web servers, fetch forms from the web servers, parse the forms and submit the forms with random data. This often leads to fake accounts and spam data on the web servers. Bots can imitate or replace human user behavior and perform tasks on a faster pace than a human user of a client device. However, the traffic from bots can overwhelm and/or slow down a networks resources resulting in disrupted or delayed service to human users of one or more client devices. The bots can include malicious or attack bots programmed to break into accounts, steal information and/or perform malicious activities. Thus, it is increasingly important to detect and differentiate traffic and/or connections from bots versus a human user.

Some systems and devices may include or leverage a device fingerprinting mechanism to detect whether requests originates from an autonomous program. For example, a device may receive client parameters from a client device, validate the client parameters and create the unique ID for the client device. Some devices may use a JAVASCRIPT-based script including a static uniform resource locator (URL) for receiving the client parameters from client devices, and the JAVASCRIPT/URL may be the same for all the customers, domains, clients and sessions. Such implementations may be prone to non-detection of autonomous programs, since an autonomous program may execute the JAVASCRIPT-based script to provide client parameters to the device across a plurality of domains, and trigger any number of requests on the device.

The systems and methods described herein may generate a unique URL for the session and clients. According to the systems and methods described herein, an autonomous program may not be aware of the unique URL for a specific client/session, and therefore the autonomous program may be prevented from access to domains and trigger requests to the device.

In various embodiments, a device described herein may receive a first request (e.g., an HTTP GET request) from a client for a resource on a server (e.g., for /index.html). The device may create an identifier (e.g., a session identifier) for the client, which may be unique to the client and used to identify the client. The device may generate and assign a value (e.g., a unique seed number) for a session between the client and server. The device may generate a reference to a resource available via a network (e.g., a unique URL) for obtaining the parameters of a client from the client. The device may generate the unique URL based on a data string or packet (such as a serialized data buffer) including various parameters, such as a domain name from the first request, a cluster identifier and/or packet identifier, the unique seed number, a transaction number, a timestamp of the request, and/or a URL for the request. The device may generate the reference as a hash of the serialized data buffer. The device may store the reference in a distributed hash table (DHT) in association with the session identifier. The device may forward the first request to the server, and receive a response from the server. The device may process the response from the server to include a link to obtain a script for executing on the client. The device may also include a request to set the identifier as a cookie at the client. The device may transmit the response with the link and the request to the client.

The client may set the identifier as a cookie for a browser of the client, and transmit a second request for the script to the device which includes the identifier. The device may receive the second request from the client, and extract the identifier from the second request. The device may validate the identifier and retrieve the reference (e.g., a unique URL) from the DHT using the identifier (e.g., a session identifier) from the second request. The device may generate a client-specific script for the client using the reference, and transmit the client-specific script to the client in response to the second request. The client may receive the client-specific script, and execute the client-specific script to transmit client parameters to the device responsive to executing the client-specific script. The device may receive a third request from the client which includes the parameters of the client and the identifier. The device may extract the identifier from the third request and the reference from the client-specific script executed by the client. The device may validate the identifier and compare whether the reference from the client matches the reference from the DHT corresponding to the identifier. The device may flag the client as executing an autonomous program responsive to the device not validating the identifier, or the reference from the client not matching the reference from the DHT corresponding to the identifier.

The systems and methods described herein may enhance autonomous program detection systems using references (e.g., unique URLs) for particular clients and identifiers (e.g., session identifiers) which are generated and maintained by the device. Such implementations and embodiments may be less prone to spoofing by an autonomous program because, where the autonomous program uses a random reference or a reference for a different client, that reference would not match a corresponding identifier for a session between the client executing the autonomous program and the server maintained by the device. Such implementations and embodiments would therefore increase security of backend servers. Various other embodiments and advantages of the present systems and methods are described in greater detail below.

In one aspect, this disclosure is directed to a method. The method includes receiving, by a device, a request from a client responsive to execution of a script on the client. The request includes a location corresponding to the script and an identifier. The method includes determining, by the device, that activity of the client as activity of an autonomous program based on a comparison of the location to a reference, the reference being generated by the device for the client using the identifier from the request. The method includes blocking, by the device, responsive to the determination, a subsequent request from the client to a server.

In some embodiments, the reference and the location are uniform resource locators (URLs), and the URLs are generated by the device for the client, and include data corresponding to at least one of the client, a session of the client, or the request. In some embodiments, the method further includes storing, by the device, the reference in a distributed hash table in association with the identifier. In some embodiments, the method further includes identifying, by the device, the reference using the identifier from the request. In some embodiments, the method further includes generating, by the device, the script for the client using the reference and data corresponding to at least one of the client, a session of the client, or the request.

In some embodiments, the request is a second request, and the reference includes data corresponding to at least one of a domain name for a first request received prior to the first request from the client, a cluster node identifier corresponding to the device, a packet engine identifier corresponding to the device, a transaction number for the first request, a timestamp for the first request, or a uniform resource locator (URL) for the domain name for the first request. In some embodiments, the reference is a hashed value of the data. In some embodiments, the request is a second request. The method may further include receiving, by the device from the client, a first request prior to the second request, and transmitting, by the device to the client, a response including data to obtain the script from the device and the identifier identifying a session between the client and a server, wherein the response to the first request causes the client to set the identifier as a cookie. In some embodiments, the method further includes receiving, by the device from the client, a third request subsequent to receiving the first request and prior to receiving the second request, the third request requesting the script, the second request including the identifier, and transmitting, by the device, the script to the client, the script generated by the device based on the client, the session, or the first request. In some embodiments, the device determines that the activity of the client is autonomous program activity responsive to the identifier from the request not matching the identifier generated for the session, or the location not matching the reference corresponding to the identifier.

In another aspect, this disclosure is directed to a device. The device includes one or more processors configured to receive a request from a client responsive to execution of a script on the client. The request includes a location corresponding to the script and an identifier. The one or more processors are configured to determine that activity of the client activity of an autonomous program based on a comparison of the location to a reference being generated by the device for the client and determined using the identifier from the request. The one or more processors are configured to block, responsive to the determination, a subsequent request from the client to a server.

In some embodiments, the reference and the location are uniform resource locators (URLs), and the URLs are generated by the device for the client, and include data corresponding to at least one of the client, a session of the client, or the request. In some embodiments, the one or more processors are further configured to store the reference in a distributed hash table in association with the identifier. In some embodiments, the one or more processors are further configured to identify the reference using the identifier from the request. In some embodiments, the one or more processors are further configured to generate the script for the client using the reference and data corresponding to at least one of the client, a session of the client, or the request. In some embodiments, the request is a second request, and the reference includes a hashed value of data corresponding to at least one of a domain name for a first request received prior to the first request from the client, a cluster node identifier corresponding to the device, a packet engine identifier corresponding to the device, a transaction number for the first request, a timestamp for the first request, or a uniform resource locator (URL) for the domain name for the first request.

In some embodiments, the request is a second request. The one or more processors may be further configured to receive, from the client, a first request prior to the second request, and transmit, to the client, a response including data to obtain a script from the device and the identifier identifying a session between the client and a server, wherein the response to the first request causes the client to set the identifier as a cookie. In some embodiments, the one or more processors are further configured to receive, from the client, a third request subsequent to receiving the first request and prior to receiving the second request, the third request requesting the script executable on the client, the second request including the identifier, and transmit the script to the client, the script generated based on the client, the session, or the first request. In some embodiments, the one or more processors are configured to determine that the activity of the client is autonomous program activity responsive to the identifier from the request not matching the identifier generated for the session, or the location not matching the reference corresponding to the identifier.

In another aspect, this disclosure is directed to a non-transitory computer-readable medium. The medium stores instructions that, when executed by one or more processors, cause the one or more processors to receive a request from a client responsive to execution of a script on the client. The request includes a location corresponding to the script and an identifier. The medium further stores instructions that cause the one or more processors to determine that activity of the client is activity of an autonomous program based on a comparison of the location to a reference being generated by the device for the client and determined using the identifier from the request. The medium further stores instructions that cause the one or more processors to block, responsive to the determination, a subsequent request from the client to a server.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
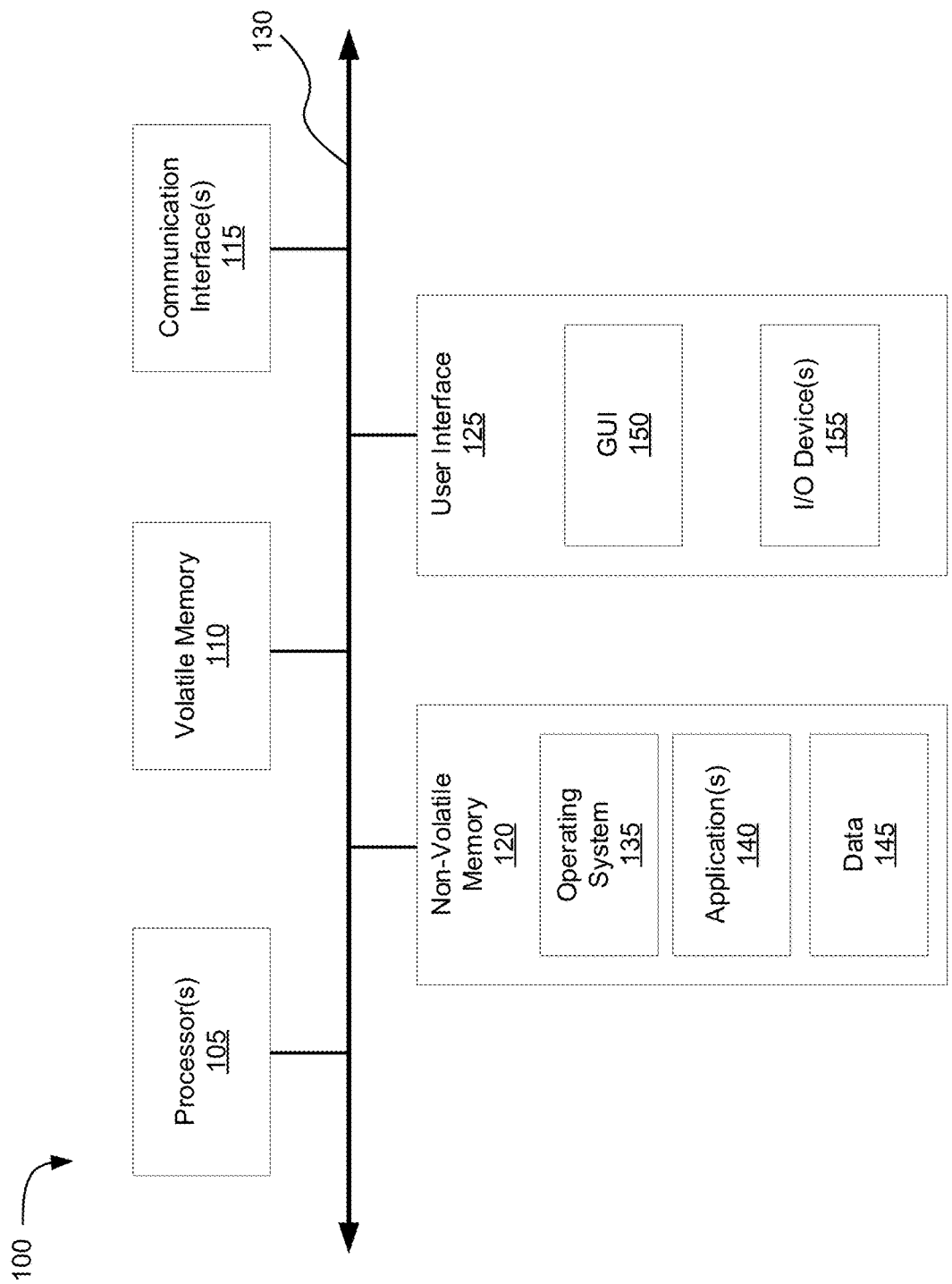
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes embodiments of systems and methods for autonomous program detection.

A. Network and Computing Environment

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computer 100 may execute an application on behalf of a user of a client computing device. For example, the computer 100 may execute a virtual machine, which provides an execution session within which applications execute on behalf of a user or a client computing device, such as a hosted desktop session. The computer 100 may also execute a terminal services session to provide a hosted desktop environment. The computer 100 may provide access to a computing environment including one or more of: one or more applications, one or more desktop applications, and one or more desktop sessions in which one or more applications may execute.

Figure 1B:
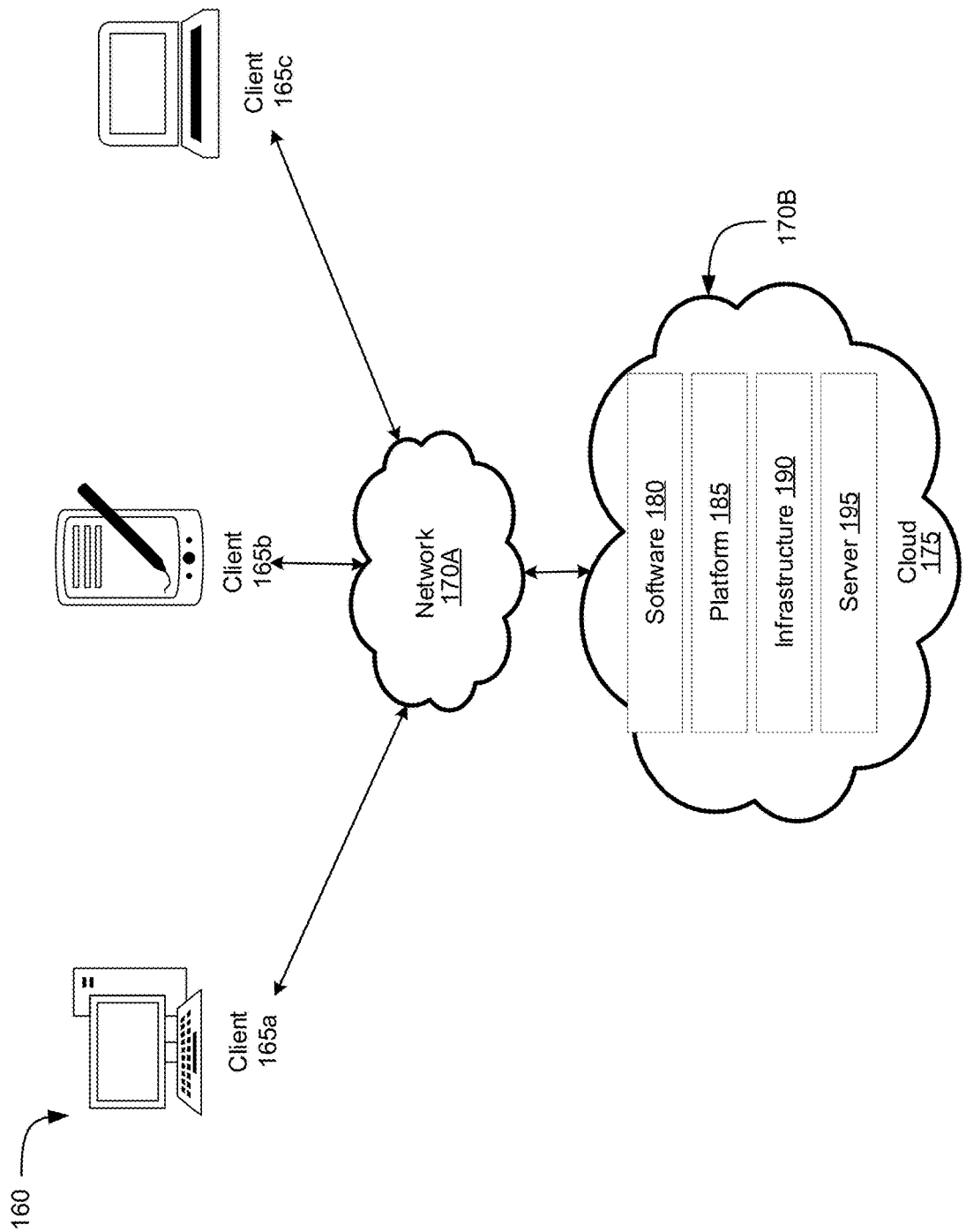
FIG. 1B is a block diagram depicting a computing environment including client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Autonomous Program Detection

The present disclosure is directed towards systems and methods for bot (or autonomous program) detection. In some aspects, the present disclosure is directed towards a device (and corresponding method) for autonomous program detection in distributed systems in real-time.

Bots or autonomous programs (e.g., web robots) are prevalent in today's network traffic. For example, up to 40% of current internet/network traffic originates from autonomous programs. These autonomous programs typically fetch content from web servers, fetch forms from the web servers, parse the forms and submit the forms with random data. This often leads to fake accounts and spam data on the web servers. Bots can imitate or replace human user behavior and perform tasks on a faster pace than a human user of a client device. However, the traffic from bots can overwhelm and/or slow down a networks resources resulting in disrupted or delayed service to human users of one or more client devices. The bots can include malicious or attack bots programmed to break into accounts, steal information and/or perform malicious activities. Thus, it is increasingly important to detect and differentiate traffic and/or connections from bots versus a human user.

Some systems and devices may include or leverage a device fingerprinting mechanism to detect whether requests originates from an autonomous program. For example, a device may receive client parameters from a client device, validate the client parameters and create the unique ID for the client device. Some devices may use a JAVASCRIPT-based script including a static uniform resource locator (URL) for receiving the client parameters from client devices, and the JAVASCRIPT/URL may be the same for all the customers, domains, clients and sessions. Such implementations may be prone to non-detection of autonomous programs, since an autonomous program may execute the JAVASCRIPT-based script to provide client parameters to the device across a plurality of domains, and trigger any number of requests on the device.

The systems and methods described herein may generate a unique URL for the session and clients. According to the systems and methods described herein, an autonomous program may not be aware of the unique URL for a specific client/session, and therefore the autonomous program may be prevented from access to domains and trigger requests to the device.

In various embodiments, a device described herein may receive a first request (e.g., an HTTP GET request) from a client for a resource on a server (e.g., for/index.html). The device may create an identifier (e.g., a session identifier) for the client, which may be unique to the client and used to identify the client. The device may generate and assign a value (e.g., a unique seed number) for a session between the client and server. The device may generate a reference to a resource available via a network (e.g., a unique URL) for obtaining the parameters of a client from the client. The device may generate the unique URL based on a data string or packet (such as a serialized data buffer) including various parameters, such as a domain name from the first request, a cluster identifier and/or packet identifier, the unique seed number, a transaction number, a timestamp of the request, and/or a URL for the request. The device may generate the reference as a hash of the serialized data buffer. The device may store the reference in a distributed hash table (DHT) in association with the session identifier. The device may forward the first request to the server, and receive a response from the server. The device may process the response from the server to include a link to obtain a script for executing on the client. The device may also include a request to set the identifier as a cookie at the client. The device may transmit the response with the link and the request to the client.

The client may set the identifier as a cookie for a browser of the client, and transmit a second request for the script to the device which includes the identifier. The device may receive the second request from the client, and extract the identifier from the second request. The device may validate the identifier and retrieve the reference (e.g., a unique URL) from the DHT using the identifier (e.g., a session identifier) from the second request. The device may generate a client-specific script for the client using the reference, and transmit the client-specific script to the client in response to the second request. The client may receive the client-specific script, and execute the client-specific script to transmit client parameters to the device responsive to executing the client-specific script. The device may receive a third request from the client which includes the parameters of the client and the identifier. The device may extract the identifier from the third request and the reference from the client-specific script executed by the client. The device may validate the identifier and compare whether the reference from the client matches the reference from the DHT corresponding to the identifier. The device may flag the client as executing an autonomous program responsive to the device not validating the identifier, or the reference from the client not matching the reference from the DHT corresponding to the identifier.

The systems and methods described herein may enhance autonomous program detection systems using references (e.g., unique URLs) for particular clients and identifiers (e.g., session identifiers) which are generated and maintained by the device. Such implementations and embodiments may be less prone to spoofing by an autonomous program because, where the autonomous program uses a random reference or a reference for a different client, that reference would not match a corresponding identifier for a session between the client executing the autonomous program and the server maintained by the device. Such implementations and embodiments would therefore increase security of backend servers. Various other embodiments and advantages of the present systems and methods are described in greater detail below.

Figure 2:
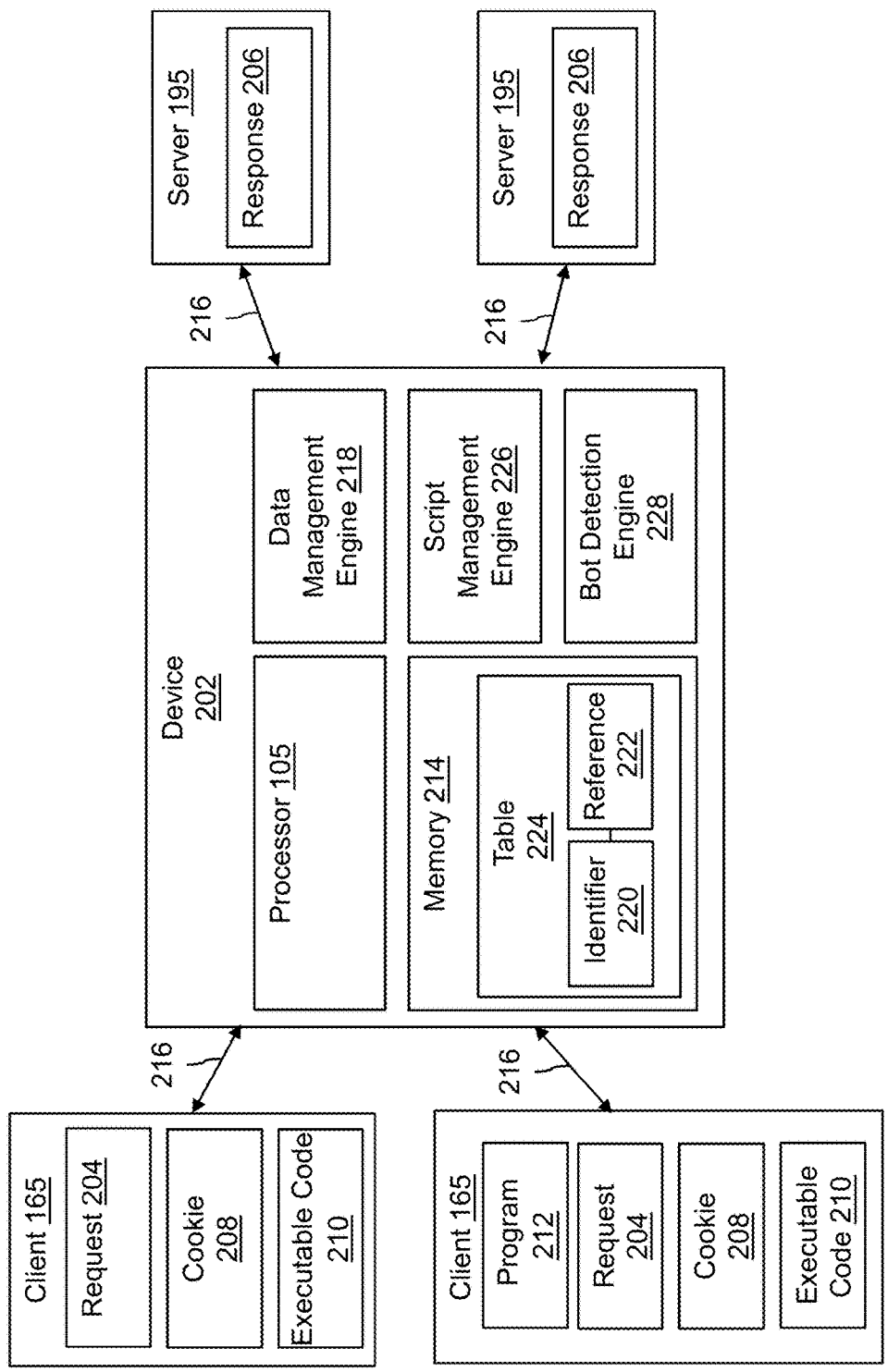
FIG. 2 is a block diagram of a system to prevent attacks on computing systems by autonomous programs, in accordance with an illustrative embodiment.

Referring now to FIG. 2, depicted is a system 200 for autonomous program management, according to an illustrative embodiment. The system 200 may include a device 202 intermediary to a plurality of clients 165 and a plurality of servers 195. The device 202 can handle or process one or more requests 204 from one or more clients 165 to one or more servers 195. The device 202 can handle or process one or more responses 206 from one or more servers 195 to one or more clients 165. As described in greater detail below, the device 202 may be configured to receive a request from a client 165, responsive to execution of a script or executable code 210 on the client 165. The request may include an identifier 220 (e.g., session identifier) and an address or reference 222 (e.g., a unique URL) corresponding to the executable code 210 (e.g., a client-specific script). The device 202 may determine that activity of the client is activity indicative of an autonomous program (e.g., activity originating from a client 165 executing an autonomous program 212) based on a comparison of an address or location from the request to a reference 222 generated by the device 202 for the client 165 and determined using the identifier 220 from the request. The device 202 may be configured to block a subsequent request from the client 165 to a server 195 based on the determination.

The device 202 can be implemented using hardware or a combination of software and hardware. For example, each component of the device 202 can include logical circuitry (e.g., a central processing unit or CPU) that responses to and processes instructions fetched from a memory unit (e.g., memory 214). Individual components of the device 202 can include or use a microprocessor 105 or a multi-core processor 105. A multi-core processor 105 can include two or more processing units on a single computing component. Each component of the device 202 can be based on any of these processors, or any other processor capable of operating as described herein. Processors 105 can utilize instruction level parallelism, thread level parallelism, different levels of cache, etc. For example, the device 202 can include at least one logic device such as a computing device or server having at least one processor 105 to communicate via a network 170. The components and elements of the device 202 can be separate components or a single component. For example, the device 202 can include combinations of hardware and software, such as one or more processors 105 configured to initiate stop commands, initiate motion commands, and transmit or receive event data, for example.

The device 202 can include a memory component (e.g., memory 214) to store and retrieve data. The memory 214 can include a random access memory (RAM) or other dynamic storage device, coupled with the device 202 for storing information, and instructions to be executed by the device 202. The memory 214 can include at least one read only memory (ROM) or other static storage device coupled with the device 202 for storing static information and instructions for the device 202. The memory 214 can include a storage device, such as a solid state device, magnetic disk or optical disk, coupled with the device 202 to persistently store information and instructions.

Clients 165 can include any form of a computing device described herein. The clients 165 can generate a request 204 for at least one server 195 or for an application or resource provided by at least one server 195. The request 204 can identify or indicate the server 195 and/or the application. The request 204 can identify or indicate the client 165 transmitting the request 204. The client 165 can transmit or provide the request 204 to the device 202 through at least one connection 216. For example, the clients 165 can connect with the device 202 and/or one or more servers 195 through one or more connections 216. The client 165 can establish a connection 216 to the device 202 to access or request access to at least one server 195 or an application provided by a server 195.

The connections 216 can include a channel, connection or session between a client 165 and the device 202, between the device 202 and a server 195 and/or between a client 165 and a server 195. In some embodiments, the connections 216 can include encrypted and/or secure connections 216. For example, the connections 216 may include encrypted sessions and/or secure sessions. The encrypted connections 216 can include encrypted files, data and/or traffic transmitted between a client 165 and the device 202, between the device 202 and a server 195 and/or between a client 165 and a server 195.

In some embodiments, a client 165 can include or execute an autonomous program 212. In embodiments, an autonomous program 212 can imitate a client 165 and can initiate a connection or attempt to connect to the device 202. The autonomous program 212 can include or correspond to a bot or web robot configured to behave like a human user of a client 165. For example, the autonomous program 212 can imitate or replace human user behavior and perform tasks, such as but not limited to, interacting with or following a link provided within a response 206 or a web page. In embodiments, the autonomous program 212 provides one or more requests 204 to the device 202. For example, the autonomous program 212 can generate a request 204 for the server 195 and forward the request 204 to the device 202.

Servers 195 can include or deploy as, and/or be executed on any type and form of computing device, such as any desktop computer, laptop computer, or mobile device capable of communication over at least one network and performing the operations described herein. For example, servers 195 can include or correspond to one computer, a plurality of computers, or a network of distributed computers such as computer 100 shown in FIG. 1A. In embodiments, servers 195 can executes one or more applications on behalf of one or more of clients 165 (e.g., as an application server), although other uses are possible, such as a file server, gateway server, proxy server, or other similar server uses. Clients 165 may seek access to hosted applications on servers 106. The applications may include network applications that are served from and/or hosted on one or more servers (e.g., server 195, remote servers, application servers). The applications can include an application hosted on at least one server 195 and accessed by at least one client 165 via a network 170. The applications can include, but not limited to, a web application, a desktop application, remote-hosted application, a virtual application, a software as a service (SaaS) application, a mobile application, an HDX application, a local application, a native application (e.g., native to the client device), and/or a device couple with one or more of the clients 165.

The above-mentioned elements or entities are implemented in hardware, or a combination of hardware and software, in one or more embodiments. Individual components of the device 202 may be implemented using hardware or a combination of hardware or software detailed above in connection with FIGS. 1A-1B. For instance, these elements or entities can include any application, program, library, script, task, service, process or any type and form of executable instructions executing on hardware of a client device (e.g., device 202). The hardware includes circuitry such as one or more processors 105 in one or more embodiments.

The device 202 may be configured to generate an identifier 220 and reference 222 for determining whether the client 165 is associated with a user (as opposed to an autonomous program 212). For example, the device 202 may include a data management engine 218. The data management engine 218 may be or include any device, component, or hardware configured to generate data used to identify a client 165. The data management engine 218 may be configured to process requests and responses to/from the client 165 and/or server 195. As described in greater detail below, the data management engine 218 may be configured to generate an identifier 220 and an address or reference 222 for the client 165. The data management engine 218 may be configured to store the identifier 220 and the reference 222 in a table 224 (such as a distributed hash table). The device 202 may include a script management engine 226. The script management engine 226 may be or include any device, component, or hardware configured to generate a script or executable code 210 (e.g., a client-specific script) for executing on the client 165. The script management engine 226 may use the reference 222 from the distributed hash table 224 for generating the script or executable code 210. The device 202 may include a bot detection engine 228. The bot detection engine 228 may be or include any device, component, or hardware configured to classify activity from clients 165 as that being done or otherwise initiated by autonomous programs based on data received from requests of the client 165.

In some embodiments, the data management engine 218 may be configured to receive a request 204 from a client 165. The request 204 may be, for example, an HTTP POST request, an HTTP GET request, etc. The request 204 may specify or include data corresponding to an address of a server 195 which is to service the request 204. For example, the request 204 may include a domain name for a resource hosted on the server 1954, a URL for the resource which is to be accessed at the server 204, and so forth.

The data management engine 218 may be configured to create, determine, produce, or otherwise generate an identifier 220 (e.g., a session identifier) for the client 165. The data management engine 218 may be configured to generate and assign the identifier to the session of the client 165, for example, responsive to receiving an initial request from the client 165 to establish a session with the server 195, responsive to establishing the session between the client 165 and the server 195, and so forth. The identifier 220 may be a code, set of characters, and so forth which are assigned to a session. The data management engine 218 may be configured to generate the identifier 220 for a session between the client 165 and the server 195. As such, the identifier 220 may be unique to a particular session between the client 165 and the server 195, and correspond to a domain which is accessed at the server 195 (corresponding to the request). In some embodiments, the data management engine 218 may be configured to generate the identifier 220 by assigning a string of characters (e.g., a unique string of alphanumeric characters) to the particular session. In some embodiments, the data management engine 218 may be configured to generate the identifier 220 based on the particular session such that the identifier 220 includes data corresponding to the request and/or the session (such as the domain name from the request, an address of the server, an IP address of the client, etc.). In these and other embodiments, the data management engine 218 may be configured to generate an identifier 220 which is unique to the session between the client 165 and server 195.

The data management engine 218 may be configured to create, determine, produce, or otherwise generate an address or reference 222 (or URL) for the client 165. The data management engine 218 may be configured to generate the reference 222 for the client 165, for example, responsive to receiving a request which does not include a cookie indicating whether the client 165 is executing an autonomous program. As another example, the data management engine 218 may be configured to generate the reference 222 for the client 165 responsive to receiving a request to establish a session (e.g., similar to the identifier 220). As described in greater detail below, the data management engine 218 may be configured to generate the reference 222 using data from the request from the client 165, identifiers of the device 202, and so forth. The reference 222 may be an address, location, or URL which is used by the client 165 when executing a script or executable code 210. For example, the reference 222 may be an address in which the client 165 uses for transmitting a POST request responsive to executing the client-specific script. The reference 222 may include data which identifies the client 165 and/or the session with the server 195. As described in greater detail below, the data management engine 218 may be configured to generate the reference 222 using data from the first request from the client 165. The client 165 may use the address or reference 222 for sending, posting, or transmitting a request responsive to executing a script or other code on the client 165.

In some embodiments, the data management engine 218 may be configured to generate the reference 222 or address by generating a value for the client 165. In some embodiments, the value may be an initial value for a pseudorandom number generator (such as a random seed number). The value may be or include a numeric code (or alphanumeric code) assigned or otherwise associated with the client 165. In some embodiments, the data management engine 218 may include or otherwise access a random or pseudorandom number generator to generate the value for the client 165. The data management engine 218 may be configured to use the value for generating the address or reference 222 for the client 165, as described in greater detail below.

The data management engine 218 may be configured to determine, detect, or otherwise identify a cluster node identifier of a cluster or node. The cluster node identifier may be an identifier of a cluster or node which received the request from the client 165. For example, the cluster node identifier may be an identifier for the device 202. The data management engine 218 may be configured to determine, detect, or otherwise identify a packet engine identifier which inspected, executed, managed, parsed, or otherwise processed the request. Similar to the cluster node identifier, the packet engine identifier may be an identifier of a packet engine which processed the request from the client 165. For example, the packet engine identifier may be an identifier for the data management engine 218 (or the device 202). The data management engine 218 may be configured to use the cluster node identifier and the packet engine identifier for generating the address or reference 222 for the client 165, as described in greater detail below.

The data management engine 218 may be configured to determine, detect, or otherwise identify various data corresponding to the request for generating the reference 222 for the client 165. The data management engine 218 may be configured to identify time pertaining to the request (e.g., by identification of a timestamp corresponding to the request). For example, a timestamp may indicate a time in which the request was generated by the client 165, a time in which the request was received by the device 202, a time in which the data management engine 218 parses or otherwise processes the request, etc. The data management engine 218 may be configured to identify a domain and an address (e.g., a URL) from the request. The domain may be a domain of an application, service, etc. which is hosted by the server 195. The address or reference may be a location on a network corresponding to a resource on the server 195 which is to be accessed by the client 165. The domain and address may be included in and identified from the request received by the data management engine 218 from the client 165. The data management engine 218 may be configured to identify, extract, or otherwise determine the domain and address from the request.

The data management engine 218 may be configured to determine, create, or otherwise generate a data packet or string, such as a serialized data buffer. The data management engine 218 may be configured to generate the data string using the domain name, cluster node identifier, packet engine identifier, random seed number, a transaction number assigned or otherwise provided by the data management engine 218 for the request, the timestamp for the request, and the URL from the request. In some embodiments, the data management engine 218 may be configured to format the data string using the data described above. For example, the data string may include a format of (domain name, cluster node identifier, packet engine identifier, [a sum of the random seed number and the transaction number], the timestamp, and the URL). In some embodiments, the data management engine 218 may be configured to generate a serialized data buffer which includes the format described above.

The data management engine 218 may be configured to generate the reference 222 for the client 165 using the data packet or string (e.g., the serialized data buffer). In some embodiments, the data management engine 218 may be configured to compute a hash of the serialized data buffer to generate the reference 222 for the client 165. In some embodiments, the data management engine 218 may include or otherwise use hashing techniques to calculate a hash of the serialized data buffer. The data management engine 218 may be configured to generate the reference 222 as the calculated hash of the data string. In other words, the reference 222 for the client 165 may be a hashed value of the data string for the client 165.

The device 202 is shown to include a table 224 (e.g., distributed hash table) storing identifiers 220 and associated references 222. The data management engine 218 may be configured to populate, update, or otherwise maintain the table 224 using the identifiers 220 and references 222 generated for a client 165 as described above. As such, the table 224 may include a plurality of identifiers 220 for a plurality of clients, and references 222 for the sessions of the plurality of clients 165. In some embodiments, where a client 165 has a plurality of sessions which are accessed via the device 202 on a plurality of servers 195, the table 224 may include a plurality of identifiers 220 for the sessions of the client 165 and a plurality of references 222 for individual identifiers 220 of the client 165. In other words, individual identifiers and references 220, 222 may correspond to a session of a particular client 165. The data management engine 218 may be configured to store the identifier 220 in association with the reference 222 for the session of the client 165 in the table 224, which is generated as described above.

The data management engine 218 may be configured to forward the request received from the client 165 to the server 195. The server 195 may be configured to process or service the request and transmit a response 206 to the client 202 for sending to the client 165. The data management engine 218 may be configured to receive the response 206 to the request from the server 195. The data management engine 218 may be configured to parse, analyze, or otherwise inspect the response 206 from the server 195 to incorporate data into the response 206. For example, the data management engine 218 may be configured to inject, insert, or otherwise incorporate a link to obtain a script or other executable code 210 into the response. As another example, the data management engine 218 may be configured to incorporate the identifier into the response with a request to set the identifier as a cookie on a browser of the client 165. While these examples are described as being incorporated into the response 206, in some embodiments, the data management engine 218 may send the link and/or identifier with the request to set the identifier in one or more separate data packets (which may be sent prior to, with, or following the response to the client 165).

The data management engine 218 may be configured to transmit the response to the request from the server 195 to the client 165. As described above, the response may include a link for the client 165 to obtain a script or executable code 210 for executing on the client. The response may also include the identifier generated by the data management engine 218 for the client 165. The client 165 may set the identifier as a cookie for a browser of the client 165. The client 165 may launch, select, or otherwise launch the link to generate a second request for obtaining the script or executable code 210. The client 165 may transmit the second request with the identifier in a header of the second request responsive to the link launching on the client 165.

The script management engine 226 may be configured to receive the second request from the client 165. The script management engine 226 may be configured to detect, determine, extract, or otherwise identify the identifier 220 from the second request. The script management engine 226 may be configured to validate the identifier 220 from the second request (e.g., to determine whether a session identifier 220 is valid or expired, corresponds to a session identifier 220 generated by the data management engine 218, etc.). The script management engine 226 may be configured to generate a script or other executable code 210 for the client 165 responsive to validating the identifier 220 from the second request of the client 165. In some embodiments, where the script management engine 226 is incapable of validating the identifier 220, the script management engine 226 may be configured to generate an invalid identifier response for the client 165. In some embodiments, where the script management engine 226 is incapable of validating the identifier 220, the script management engine 226 may be configured to flag or otherwise identify the client 165 as an autonomous program.

The script management engine 226 may be configured to use the validated identifier 220 from the request to generate the executable code or script 210 for the client. The script management engine 226 may be configured to perform a look-up function using the identifier 220 in the table 224 to identify the reference 222 corresponding to the identifier 220. In this regard, the identifier 220 may be a key in the table 224, and the reference 222 may correspond to the key in the table 224. The script management engine 226 may be configured to use the reference 222 to generate the script 210 for the client 165.

The script management engine 226 may be configured to generate a script or other executable code 210 using the reference 222 from the table 224 corresponding to the identifier 220. The executable code 210 may be or include a script or code (such as JAVASCRIPT) which executes (e.g., automatically executes) on the client 165 to perform a function. In some embodiments, the executable code 210 may execute on the client 165 to generate a request (e.g., an HTTP POST request) which includes one or more client parameters corresponding to the client 165. The client parameters may include, for instance, parameters corresponding to the browser such as a user-agent, browser name (e.g., Internet Explorer, GOOGLE Chrome, FIREFOX, SAFARI, OPERA, etc.), a browser version, a browser major version etc., attributes corresponding to the device, such as operating system (e.g., WINDOWS, MAC, LINUX, UBUNTU, SOLARIS), a device model, a device vendor, a device type, a central processing unit (CPU) architecture, whether the device is a mobile device and attributes corresponding thereto (e.g., mobile version, mobile OS [such as ANDROID, OPERA mini, IEMobile, BLACKBERRY, IPHONE, IPAD, IPOD]), screen parameters (e.g., current screen resolution, available screen resolution, color depth, device XDPI, device YDPI), whether the device has any plugins enabled and corresponding versions (e.g., JAVA, Flash, SILVERLIGHT, etc.), mime types, fonts (such as current or available fonts), local storage availability, whether cookies are enabled, a current time zone, a language, a system language, a canvas, etc. When the client 165 executes the executable code 210, the client 165 may be configured to transmit an HTTP POST request to a location (such as an address, URL, etc.) specified in the script 210. The location may be or correspond to the reference 222 from the table 224. The HTTP POST request may include one or more of the client parameters described above.

In some embodiments, the script management engine 226 may be configured to generate the executable code 210 to specify the location in which the client 165 is to transmit the HTTP POST request including various client parameters. In some embodiments, the address may be (or correspond to) the reference 222 generated by the data management engine 218 for the client 165. In this regard, when the client 165 executes the client-specific script 210, the client 165 may be configured to automatically transmit an HTTP POST request to an address which includes or corresponds to the reference 222 corresponding to a particular identifier 220. The script management engine 226 may be configured to transmit, send, or otherwise provide the script or executable code 210 to the client 165 in response to receiving the second request from the client 165. As described in greater detail below, the device 202 may be configured to use the identifier from the HTTP POST request (responsive to the script 210 executing on the client 165) to determine or classify the activity of the client 165 as activity of an autonomous program.

The bot detection engine 228 may be configured to receive a request from the client 165. The bot detection engine 228 may be configured to receive the request from the client 165 responsive to the executable code 210 executable on the client 165. The request may include a header which includes the identifier 220 for the client 165 (e.g., following the identifier being set as a cookie 208 at the client 165). The bot detection engine 228 may be configured parse, analyze, inspect, or otherwise use the request to determine or classify the client 165 as executing an autonomous program.

Similar to the script management engine 226, the bot detection engine 228 may be configured to validate the identifier 220 from the request. In some embodiments, the bot detection engine 228 may be configured to validate the identifier 220 from the request by performing a look-up function in the table 224 using the identifier 220 from the request to determine whether the identifier 220 is included in the table 224 (i.e., indicating that the identifier 220 originated from the device 202). In some embodiments, the bot detection engine 228 may be configured to validate the identifier 220 from the request by identifying a time associated with the identifier 220 (such as a timestamp included or incorporated in the identifier). The bot detection engine 228 may be configured to compare the time associated with the identifier with an expiry or expiration time to determine whether the identifier 220 is valid or expired. In some instances, where the bot detection engine 228 is incapable of validating the session identifier 220, the bot detection engine 228 may be configured to flag, identify, or classify the client 165 as an autonomous program.

The bot detection engine 228 may be configured to use the validated session identifier 220 from the request to identify the reference 222 corresponding to the identifier 220. The bot detection engine 228 may be configured to perform a look-up function using the identifier 220 from the request in the table 224 to identify the reference 222 in the table 224 corresponding to the identifier 220. The bot detection engine 228 may be configured to determine an address, URL, or location used by the client 165 responsive to executing the executable code 210 for transmitting the request. The bot detection engine 228 may be configured to compare the location used by the client to the reference 222 from the table 224 corresponding to the identifier 220 from the request. The bot detection engine 228 may be configured to classify the client 165 based on the comparison. For example, where the reference 222 from the table 224 matches the location used by the client 165 for transmitting the request, the bot detection engine 228 may classify the client 165 as being operated by a user. On the other hand, where the reference 222 from the table 224 does not match the location used by the client 165 for transmitting the request, the bot detection engine 228 may classify the activity of the client 165 as autonomous program activity (e.g., the request as originating from an autonomous program 212 executing on the client 165). In other words, the bot detection engine 228 may use the data from the request to classify the client 165 as associated with a user (e.g., that a user is operating the client 165 which generated the request), or classify the client 165 as associated with an autonomous program 212 (e.g., that an autonomous program 212 is executing on the client 165 or is otherwise not being operated by a user).

Once the bot detection engine 228 determines whether the client 165 is associated with a user or an autonomous program 212, the bot detection engine 228 may be configured to generate a flag, identifier, string of bits or bytes, or other indicator which indicates (e.g., to the device 202 responsive to receiving the indicator in a subsequent request) that the client 165 is associated with a user (or an autonomous program 212). For example, the bot detection engine 228 may receive a subsequent request from a client 165 which includes the indicator (e.g., in a header of the request following the indicator being set as a cookie on a browser of the client 165), and parse the indicator to determine whether the client 165 was previously classified as being associated with a user or an autonomous program 212. The bot detection engine 228 may include, maintain, store, or otherwise access a data structure including corresponding indicators which indicate whether a client 165 is associated with a user or an autonomous program. The bot detection engine 228 may be configured to generate a cookie 208 for setting at the client 165 based on the indicator. For example, where the bot detection engine 228 determines that the client 165 is associated with a user, the bot detection engine 228 may be configured to generate a cookie 208 having the indicator which indicates that the client 165 is associated with a user. The device 202 may be configured to transmit the cookie 208 to set at the client 165. When the client 165 generates one or more subsequent requests and transmits those requests to the device 202, the client 165 may include the indicator (e.g., as a header of the request, or otherwise included with the requests). In some embodiments, the indicator may be generic (e.g., a first indicator which indicates that a client 165 was flagged as being associated with a user and a second indicator which indicates that a client 165 was flagged as being associated with an autonomous program 212). In some embodiments, the indicator may be unique to individual clients 165 (e.g., a client-specific indicator which includes identifying information, such as an IP address, for the client 165 and indicates whether the client was flagged as being associated with a user or an autonomous program 212). The device 202 may be configured to parse the request to extract the indicator from the request. The device 202 may compare the indicator from the request with indicators stored or otherwise maintained by the device 202 (which may be client-specific indicators or generic indicators as described above). The device 202 may determine that the client 165 is associated with a user (e.g., by performing a comparison of the indicator from the request with an indicator stored in a data structure maintained or otherwise accessed by the device 202), and process the request accordingly.

On the other hand, where the bot detection engine 228 determines that the client 165 is associated with an autonomous program 212, the bot detection engine 228 may be configured to generate a cookie 208 having the indicator which indicates that the client 165 is associated with an autonomous program 212. The device 202 may be configured to transmit the cookie 208 to set at the client 165. When the client 165 generates one or more subsequent requests and transmits those requests to the device 202, the client 165 may include the indicator with the requests as described above. The device 202 may be configured to parse the cookie 208, determine that the client 165 is associated with an autonomous program 212 (e.g., by performing a comparison of the indicator from the cookie 208 with an indicator stored in a data structure maintained or otherwise accessed by the device 202), and block the requests. As such, the device 202 may parse the cookie 208 to determine that the client 165 is associated with an autonomous program 212 rather than repeating the steps and functions described above to continuously determine whether a client 165 is operated by a user or is executing an autonomous program.

Figure 3:
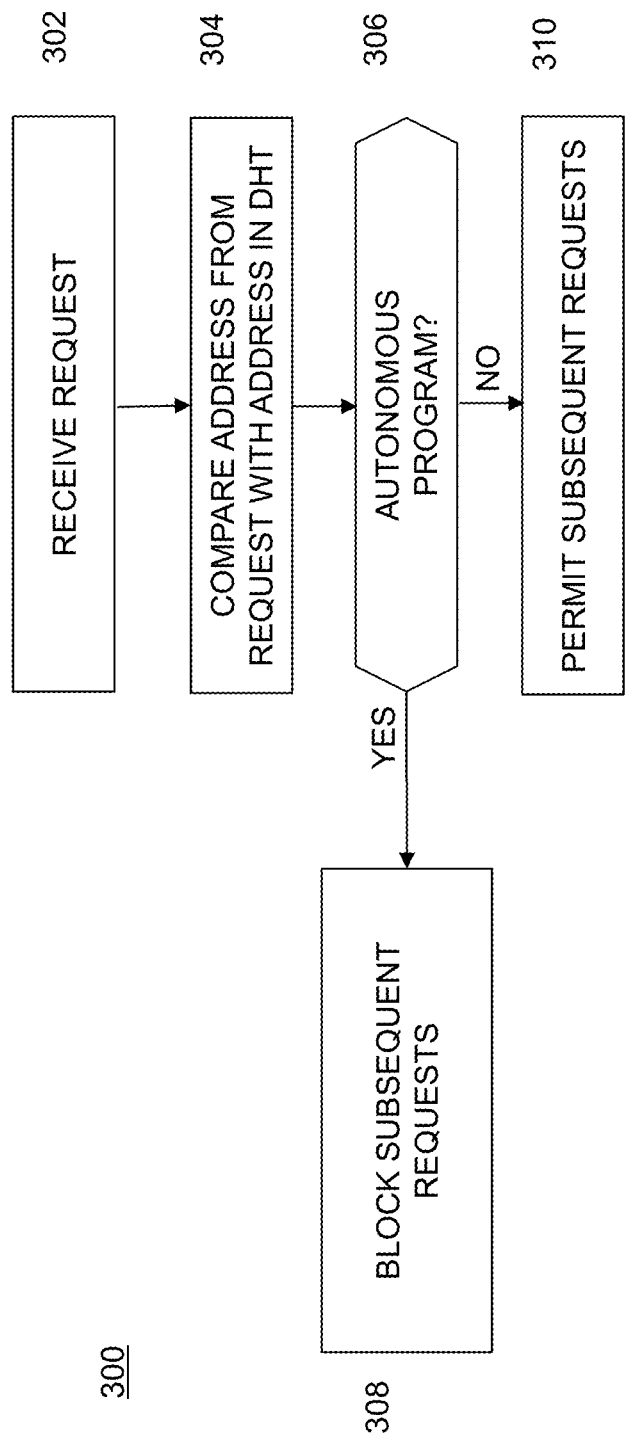
FIG. 3 is a flow diagram of a method to prevent attacks on computing systems by autonomous programs, in accordance with an illustrative embodiment.

Referring now to FIG. 3, depicted is a flow diagram of one embodiment of a method 300 for autonomous program detection, according to an illustrative embodiment. Any of the operations described herein may be performed by one or more of the components or devices described above, for example, the device 202 or processor 105 (e.g., using instructions from memory 214). As a brief overview of the method 300, at step 302, the device may receive a request (e.g., from a client). At step 304, the device may compare an address from the request with an address from the table. At step 306, the device may classify the client based on the comparison. At step 308, where the device classifies the client as executing an autonomous program, the device may block or otherwise restrict subsequent request(s) from the client. At step 310, where the device classifies the client as being operated by a user, the device may permit subsequent request(s).

In some embodiments, prior to receiving the request at step 302, the device may receive an initial request from a client. The initial request may be a request to access a resource hosted at a server. The initial request may specify a domain corresponding to a webpage or website, an application, a service, etc. hosted on the server. The initial request may also include an address or location (e.g., a URL) corresponding to the resource to be accessed. The device may transmit the initial request to the server, and receive a response from the server. The device may generate an identifier (e.g., a session identifier) for the client. The device may generate a reference (e.g., an address or a unique URL) for the client based on the initial request. The device may generate the reference for the client using data corresponding to a domain name for the initial request, a cluster node identifier corresponding to the device, a packet engine identifier corresponding to the device, a transaction number for the initial request, a timestamp for the initial request, and/or a URL for the domain name for the initial request. In some embodiments, the device may generate the address as a hashed value of the data described above. In other words, the reference may include data corresponding to a domain name for the initial request, a cluster node identifier corresponding to the device, a packet engine identifier corresponding to the device, a transaction number for the initial request, a timestamp for the initial request, and/or a URL for the domain name for the initial request. The device may store the reference for the client in a table (e.g., a distributed hash table) in association with the identifier for the client. The device may transmit the response from the server to the client. In some embodiments, the device may insert, inject, or otherwise incorporate the identifier and a link to obtain a script or other executable code into the response. In some embodiments, the device may send the identifier and/or the link to obtain the script in a packet separate from the response, which may be sent prior to, accompanying, or subsequent to the response from the server. In some embodiments, the device may send the identifier to the client with a request to set the identifier as a cookie for a browser of the client.

In some embodiments, device may receive a request to obtain a script or other executable code from the client. The device may receive the request to receive the script responsive to the client selecting or otherwise launching the link received from the device. The client may transmit the request to the client with the identifier included as a header of the request. The device may receive the request to obtain a script or executable code for execution on the client. The device may identify the identifier from the header of the request for the executable code. The device may validate the identifier from the header. The device may generate a script or other executable code responsive to validating the identifier. The device may generate the executable code by performing a look-up function in the table using the identifier from the request. The device may identify the reference corresponding to the identifier from the request. The device may generate the executable code using the reference from the table. The executable code may specify an address in which the client is to send data (e.g., included in an HTTP POST request) responsive to executing the client specific script. The reference specified in the executable may be the reference from the table corresponding to the identifier. The device may transmit, send, or otherwise provide the executable code to the client for execution.

At step 302, the device may receive a request. In some embodiments, the device may receive the request at step 302 responsive to execution of a an executable code or script on the client. The request may include a session identifier and a location corresponding to the executable code. The executable code or script may execute on the client to cause the client to generate the request. The request may be or include an HTTP POST request which includes data, such as one or more client parameters corresponding to the client. The request may include or otherwise be used by the device to identify an address corresponding to the script which executed on the client. The device may parse the HTTP POST request to identify the identifier and the location in which the HTTP POST request was sent or transmitted by the client. In some embodiments, the device may validate the identifier from the HTTP POST request. In some embodiments, the device may validate the identifier by cross-referencing the identifier to the identifiers maintained in the table to confirm that the device generated the identifier from the request. In some embodiments, the device may validate the identifier by determining a timestamp or other time corresponding to the identifier (e.g., a time in which the identifier was generated, a time in which the identifier was transmitted by the device to the client, a time in which the identifier was received from the client, etc.). The device may compare the timestamp/time corresponding to the identifier to an expiration time to determine whether the identifier is still valid (or expired). The device may validate the identifier responsive to determining that the device generated the session identifier and/or that the session identifier is not expired.

At step 304, the device may compare the location identified from the request with a reference from the table. In some embodiments, the device 304 may retrieve the reference from the table using the identifier from the request. The device 304 may perform a look-up function using the identifier from the request received at step 302 in the table to identify the reference (or address, unique URL, etc.) corresponding to the identifier. The device may compare the location identified from the request to the reference retrieved, identified from, or otherwise included in the distributed hash table corresponding to the identifier.

At step 306, the device may classify the client based on the comparison. In some embodiments, the device may determine that activity of the client is autonomous program activity based on the comparison. The device may classify the client as executing an autonomous program based on determining that the activity of the client is autonomous program activity. In some embodiments, the device may determine that the activity of the client is autonomous program activity responsive to the location from the request not matching the reference from the table corresponding to the identifier included in the request. In some embodiments, the device may determine that the activity of the client is autonomous program activity responsive to the device not successfully validating the identifier. In this regard, the device may determine that activity of the client is autonomous program activity responsive to the identifier from the request not matching the identifier generated for the session (of the client), or the location not matching the reference corresponding to the identifier.

At step 308, where the device classifies the client as executing an autonomous program, the device may block subsequent request(s) from the client to the server. In some embodiments, the device may block subsequent requests by generating an indicator which indicates that the client is associated with an autonomous program. The device may generate a cookie which includes the indicator. The device may transmit the cookie to the client for setting at the client. When the client generates subsequent requests, the client may include the cookie with the subsequent requests. The device may receive the subsequent requests from the client including the cookie. The device may parse the cookie and determine that the cookie includes the indicator which indicates that the client is associated with an autonomous program 212. The device may then block the subsequent request (e.g., based on the request including a cookie having an indicator which indicates that the client is associated with an autonomous program). In some embodiments, the device may block the subsequent request by returning a response to the client indicating that the request has been blocked. In some embodiments, the device may block the subsequent request by ignoring, deleting, or otherwise not generating and transmitting any responses to the client.

At step 310, where the device classifies the client as being operated by a user, the device may permit subsequent request(s). In some embodiments, the device may permit subsequent requests from the client to the server on the session. In some embodiments, the device may permit subsequent requests by generating an indicator that indicates that the client is associated with a user. The device may generate a cookie that includes the indicator. The device may transmit the cookie to the client for setting at the client. When the client generates subsequent requests, the client may include the cookie with the subsequent requests. The device may receive the subsequent requests from the client including the cookie. The device may parse the cookie and determine that the cookie includes the indicator that indicates that the client is associated with a user. The device may then permit the subsequent request (e.g., based on the request including a cookie having an indicator that indicates that the client is associated with a user). In some embodiments, the device may permit the subsequent request by transmitting, routing, or otherwise providing the request to the backend server for generating a response. The backend server may respond to the request with a response, which the device may transmit, send, or otherwise provide to the client (e.g., via the connection).

If following step 310-312, the device subsequently receives requests from clients which do not include the indicator (e.g., indicating that activity of the client has previously been classified as autonomous program (or user) activity (or the indicator has expired following an expiration interval associated with the indicator), the method may proceed back to step 302. As such, the indicator may be used for a certain duration to authenticate clients to eliminate repetitive authentication/verification/validation of clients.

Figure 4:
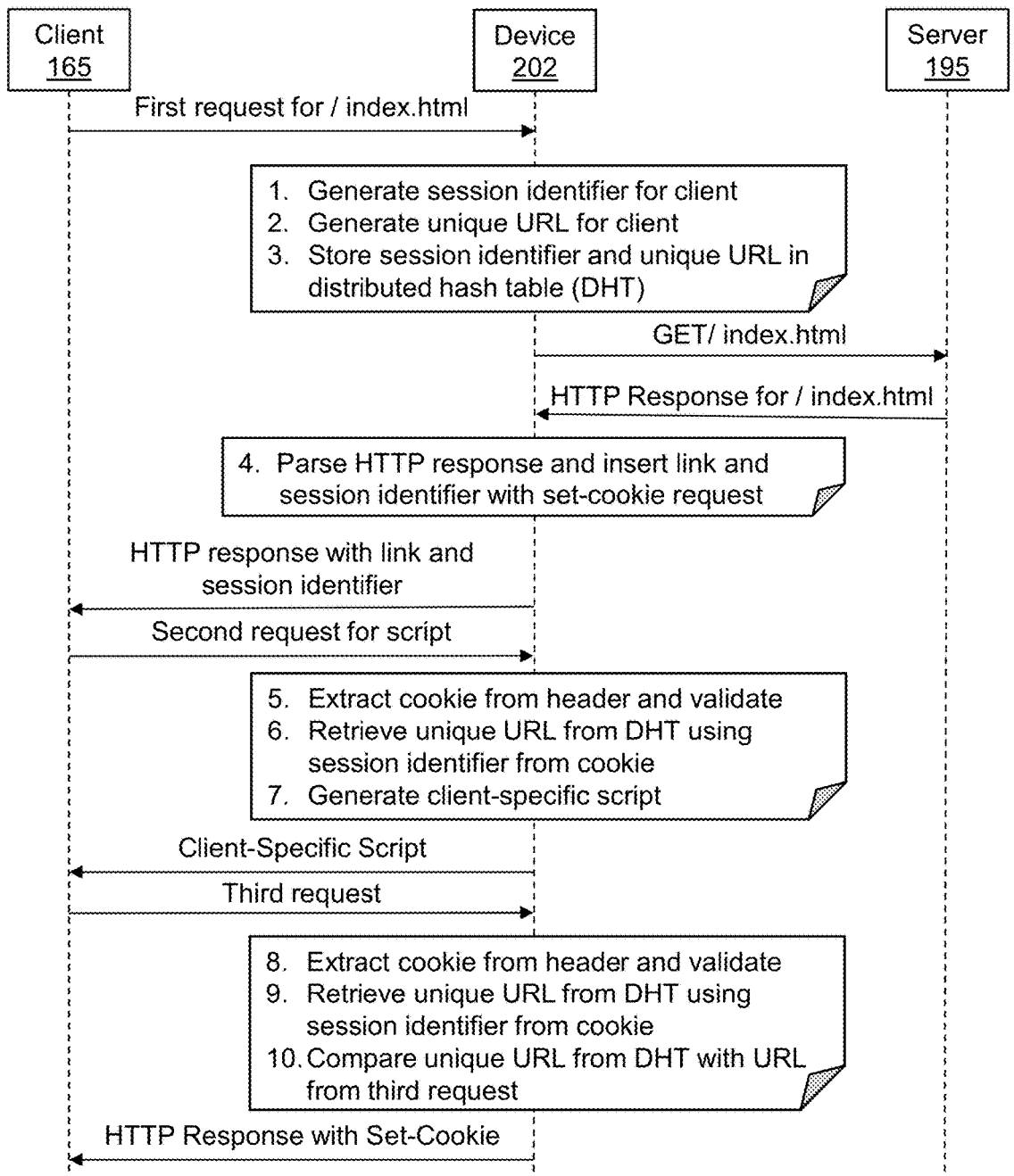
FIG. 4 is a flow diagram depicting is one possible implementation of a method of determining whether a client is operated by a user or executing an autonomous program, in accordance with an illustrative embodiment.

Referring now to FIG. 4, depicted is one possible implementation of a method 400 of determining whether client activity from a client 165 is autonomous program activity (e.g., activity originating from a client 165 which executes or is executing an autonomous program 212), according to an illustrative embodiment. The method 400 may be performed or implemented by the device 202 or one or more components thereof, such as the data management engine 218, the script management engine 226, the bot detection engine 228, and/or by the processor 105 using instructions stored on memory 214).

As shown in FIG. 4, the client 165 sends a first request (such as an HTTP GET request) to the device 202 specifying a domain name and/or address (e.g., "index.html") for transmitting to the server 195 (e.g., a backend or origin server). The request may be to access content from the server 195. The device 202 may receive the first request from the client 165. The device 202 may generate, for the client, an identifier, such as a session identifier, which identifies a session between the client 165 and the server 195. The device 202 may generate a reference, such as a unique address or URL for the client 165. The device 202 may generate the reference (e.g., the unique address or URL) based on the client 165, the device 202, the session, and/or the first request (as described in greater detail above). The device 202 may store the session identifier and reference in a table (such as a distributed hash table) at the device 202.

The device 202 may transmit the HTTP request (e.g., received from the client 165) to the server 195 according to the request from the client 165. The server 195 may transmit an HTTP response that is responsive to the request to the device 202 for transmitting back to the client 165.

Once the device 202 receives the response from the server 195, the device 202 may parse the response and generate a data packet including the response. In some embodiments, the device 202 may include data for transmitting to the client 165 in the response. For example, the device 202 may insert a link for the client 165 to request a script for executing on the client. The device 202 may insert the session identifier with a set-cookie request in the response. The device 202 may transmit the response with the link and the session identifier to the client 165.

The device 202 may receive a second request from the client 165. The second request may be or include a request for a script for executing on the client 165. The second request may include the session identifier. In some embodiments, the session identifier can be included in a header of the second request. The client 165 may include the session identifier with the second request responsive to setting the session identifier as a cookie on a browser of the client 165.

Upon the device 202 receiving the second request from the client 165, the device 202 may extract the cookie from the header of the second request or the second request itself and validate the session identifier (e.g., to confirm that the session identifier is still valid, to confirm that the device generated the session identifier, etc., as described above). The device 202 may retrieve the reference (e.g., the unique address or URL) from the table (e.g., the distributed hash table) using the validated session identifier from the second request. The device 202 may generate a script (e.g., a client-specific script) using the reference from the table. The device 202 may transmit the script to the client 165 for executing on the client 165.

The device 202 may receive a third request from the client 165. The third request may be sent by the client 165 responsive to the script executing on the client 165 and causing the client 165 to generate and transmit the third request to the device 202. In some embodiments, the third request may include an HTTP POST request, which includes various client parameters that are collected and provided in the HTTP POST request responsive to execution of the script. The device 202 may receive the third request, and extract the cookie from the header of the third request and validate the session identifier (e.g., in a manner similar to validating the session identifier described above). The device 202 may retrieve the reference (e.g., the unique address or URL) from the table (e.g., the distributed hash table) using the validated session identifier from the third request.

Responsive to the device receiving the reference using the identifier from the third request, the device 202 may compare a location corresponding to the third request (e.g., a location, address, or URL used for transmitting the HTTP POST request) with the reference (e.g., the unique address or URL) from the table to classify activity of the client 165 as user activity or autonomous program activity. The device 202 may determine whether the client 165 is being operated by (or otherwise associated with) a user or the client 165 is executing an autonomous program, based on the comparison. For example, the device 202 may determine that the location does not match the reference from the table. In some embodiments, the device 202 may determine that the client is executing an autonomous program responsive to determining the location from the third request does not match the reference from the table (i.e., because the client 165 is using a script for a different client device, and therefore the identifier from the client executing the autonomous program does not match the identifier corresponding to the script). In some embodiments, the device 202 may determine that the client 165 is corrupt or operated by a rogue user responsive to determining that the location from the third request does not match the reference from the table (i.e., because the client 165 sent the HTTP POST request to a location associated with a different session identifier, and is therefore either corrupt or is impersonating a different client 165). On the other hand, where the location from the third request matches the reference from the table, the device 202 may determine that the client is being operated by or is otherwise associated with a user (since the session identifiers match, and the addresses from the third request and distributed hash table match).

When the device 202 determines that the client 165 is associated with a user, the device 202 may generate a unique identifier for the user (or the client 165) and an indicator that indicates that the client 165 is associated with a user. The indicator may be or include a flag, identifier, or other data string/packet which indicates that activity of the client 165 has been previously classified by the device 202 as user activity. The device 202 may include, incorporate, or otherwise provide the unique identifier and indicator in a cookie (similar to cookie 208). The device 202 may transmit the cookie to the client 165 with a set-cookie function (or other function/command/request) to cause the client 165 to set the cookie for the client 165 (or a browser of the client 165). When the client 165 generates subsequent requests, the subsequent requests may include indicator for the client 165 (e.g., as a header in the subsequent request responsive to the cookie being set at the client 165). The device 202 may receive the subsequent requests (with the indicator) and parse the request to extract or otherwise identify the indicator from the subsequent request. The device 202 may determine that the client 165 is associated with a user based on the indicator indicating that the client 165 is associated with a user. The device 202 may then permit the requests (e.g., by transmitting the requests to a corresponding address for the server 195 or a different server 195, and transmitting responses from the server 195 to the client 165).

When the device 202 determines that the client 165 is associated with an autonomous program 212, the device 202 may generate a unique identifier for the client 165 and an indicator that indicates that the client 165 is associated with an autonomous program 212. In this embodiment, the indicator may be similar to the indicator described above, but indicates that the activity of the client 165 has been previously classified by the device 202 as autonomous program activity. The device 202 may include, incorporate, or otherwise provide the unique identifier and indicator in a cookie (similar to cookie 208). The device 202 may transmit the cookie to the client 165 with a set-cookie function (or other function/command/request) to cause the client 165 to set the cookie for the client 165 (or a browser of the client 165). When the client 165 generates subsequent requests, the subsequent requests may include the indicator generated by the device 202 for the client 165. The device 202 may receive the subsequent requests (with the indicator) and parse the requests to extract the indicator. The device 202 may determine that the client 165 is associated with an autonomous program 212 based on the indicator indicating that the device 202 has previously classified activity of the client 165 as autonomous program activity. The device 202 may then block the requests (e.g., by deleting or ignoring the requests, responding to the requests with a response indicating that the request has been blocked, etc.).

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
  receiving, by a device, a request from a client responsive to execution of a script on the client, the request including a first uniform resource locator (URL) corresponding to the script and a session identifier;
  determining, by the device, that activity of the client as activity of an autonomous program based on a comparison of the first URL to a reference URL, the reference URL being generated by the device for the client using the session identifier from the request; and blocking, by the device, responsive to the determination, a subsequent request from the client to a server.

2. The method of claim 1, wherein the reference URL is generated by the device for the client, and include data corresponding to at least one of the client, a session of the client, or the request.

3. The method of claim 2, further comprising storing, by the device, the reference URL in a distributed hash table in association with the session identifier.

4. The method of claim 1, further comprising identifying, by the device, the reference URL using the session identifier from the request.

5. The method of claim 1, further comprising generating, by the device, the script for the client using the reference URL and data corresponding to at least one of the client, a session of the client, or the request.

6. The method of claim 1, wherein the request is a second request, and wherein the reference URL comprises data corresponding to at least one of:
- a domain name for a first request received prior to the first request from the client;
- a cluster node identifier corresponding to the device;
- a packet engine identifier corresponding to the device;
- a transaction number for the first request;
- a timestamp for the first request; or
- a domain name URL for the first request.

7. The method of claim 6, wherein the reference URL is a hashed value of the data.

8. The method of claim 1, wherein the request is a second request, the method further comprising:
receiving, by the device from the client, a first request prior to the second request; and
transmitting, by the device to the client, a response including data to obtain the script from the device and the session identifier identifying a session between the client and a server, wherein the response to the first request causes the client to set the session identifier as a cookie.

9. The method of claim 8, further comprising:
receiving, by the device from the client, a third request subsequent to receiving the first request and prior to receiving the second request, the third request requesting the script, the second request including the session identifier;
transmitting, by the device, the script to the client, the script generated by the device based on the client, the session, or the first request.

10. The method of claim 1, wherein the device determines that the activity of the client is autonomous program activity responsive to the session identifier from the request not matching the session identifier generated for the session, or the first URL not matching the reference URL corresponding to the session identifier.

11. A device comprising:
one or more processors configured to:
receive a request from a client responsive to execution of a script on the client, the request including a first uniform resource locator (URL) corresponding to the script and a session identifier;
determine that activity of the client activity of an autonomous program based on a comparison of the first URL to a reference URL being generated by the device for the client and determined using the session identifier from the request; and
block, responsive to the determination, a subsequent request from the client to a server.

12. The device of claim 11, wherein the reference URL is generated by the device for the client, and include data corresponding to at least one of the client, a session of the client, or the request.

13. The device of claim 12, wherein the one or more processors are further configured to store the reference URL in a distributed hash table in association with the session identifier.

14. The device of claim 11, wherein the one or more processors are further configured to identify the reference URL using the session identifier from the request.

15. The device of claim 11, wherein the one or more processors are further configured to generate the script for the client using the reference URL and data corresponding to at least one of the client, a session of the client, or the request.

16. The device of claim 11, wherein the request is a second request, and wherein the reference URL comprises a hashed value of data corresponding to at least one of:
- a domain name for a first request received prior to the first request from the client;
- a cluster node identifier corresponding to the device;
- a packet engine identifier corresponding to the device;
- a transaction number for the first request;
- a timestamp for the first request; or
- a domain name URL for the first request.

17. The device of claim 11, wherein the request is a second request, and wherein the one or more processors are further configured to:
receive, from the client, a first request prior to the second request; and
transmit, to the client, a response including data to obtain a script from the device and the session identifier identifying a session between the client and a server, wherein the response to the first request causes the client to set the session identifier as a cookie.

18. The device of claim 17, wherein the one or more processors are further configured to:
receive, from the client, a third request subsequent to receiving the first request and prior to receiving the second request, the third request requesting the script executable on the client, the second request including the session identifier;
transmit the script to the client, the script generated based on the client, the session, or the first request.

19. The device of claim 11, wherein the one or more processors are configured to determine that the activity of the client is autonomous program activity responsive to the session identifier from the request not matching the session identifier generated for the session, or the first URL not matching the reference URL corresponding to the session identifier.

20. A non-transitory computer-readable medium storing instructions that, when executed by one or more processors, cause the one or more processors to:
receive a request from a client responsive to execution of a script on the client, the request including a first uniform resource locator (URL) corresponding to the script and a session identifier;
determine that activity of the client is activity of an autonomous program based on a comparison of the first URL to a reference URL generated by the device for the client and determined using the session identifier from the request; and block, responsive to the determination, a subsequent request from the client to a server.

* * * * *